US008681622B2

(12) United States Patent
Chatterjee et al.

(10) Patent No.: US 8,681,622 B2
(45) Date of Patent: Mar. 25, 2014

(54) POLICY AND CHARGING RULES FUNCTION (PCRF) AND PERFORMANCE INTELLIGENCE CENTER (PIC) BASED CONGESTION CONTROL

(75) Inventors: Amit H. Chatterjee, Apex, NC (US); Philippe Besset, Rixheim (FR); Yusun Kim Riley, Weston, MA (US); Sundaram Rajagopalan, Waltham, MA (US); Olivier Terrien, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 200 days.

(21) Appl. No.: 13/330,086

(22) Filed: Dec. 19, 2011
(Under 37 CFR 1.47)

(65) Prior Publication Data

US 2012/0257499 A1 Oct. 11, 2012

Related U.S. Application Data

(60) Provisional application No. 61/424,603, filed on Dec. 17, 2010.

(51) Int. Cl.
*H04W 28/02* (2009.01)
(52) U.S. Cl.
USPC .......... 370/232; 370/229; 370/233; 370/235; 370/248; 370/253
(58) Field of Classification Search
USPC .................. 370/229, 232, 233, 235, 248, 253
See application file for complete search history.

(56) References Cited

U.S. PATENT DOCUMENTS

| 3,917,915 A | 11/1975 | Karras |
| 4,162,377 A | 7/1979 | Mearns |
| 4,191,860 A | 3/1980 | Weber |
| 4,310,727 A | 1/1982 | Lawser |
| 4,313,035 A | 1/1982 | Jordan et al. |

(Continued)

FOREIGN PATENT DOCUMENTS

| EP | 0 088 639 | 9/1983 |
| EP | 0 212 654 | 5/1987 |

(Continued)

OTHER PUBLICATIONS

Non-Final Office Action for U.S. Appl. No. 13/251,784 (Oct. 10, 2013).

(Continued)

*Primary Examiner* — Ian N Moore
*Assistant Examiner* — Phong La
(74) *Attorney, Agent, or Firm* — Jenkins, Wilson, Taylor & Hunt, P.A.

(57) ABSTRACT

A system for congestion control in a mobile communications network includes a monitoring module configured to monitor message traffic associated with a cell in a mobile communications network. The message traffic includes control plane and user plane messages. The monitoring module determines, based on the message traffic, whether a predetermined congestion threshold associated with the cell in the mobile communications network has been crossed. In response to the threshold being crossed, the monitoring module generates a cell congestion notification message that includes the identity of subscribers that are contributing to the congestion. A policy server receives the cell congestion notification message and generates a PCC rule that modifies the policy of the one or more identified subscribers and for communicating the PCC rule to a PCEF.

21 Claims, 4 Drawing Sheets

(56) References Cited

U.S. PATENT DOCUMENTS

| | | |
|---|---|---|
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,680 A | 8/1994 | Smart et al. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott et al. |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,144,636 A * | 11/2000 | Aimoto et al. ............... 370/229 |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 7,058,036 B1 | 6/2006 | Yu et al. |
| 7,072,651 B2 | 7/2006 | Jiang et al. |
| 8,305,922 B2 * | 11/2012 | Cuervo ........................ 370/252 |
| 8,331,229 B1 * | 12/2012 | Hu et al. ....................... 370/230 |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0058507 A1 | 5/2002 | Valentine et al. |
| 2002/0111153 A1 | 8/2002 | Hartmaier et al. |
| 2002/0150079 A1 | 10/2002 | Zabawskyj et al. |
| 2003/0003928 A1 | 1/2003 | Marjelund et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0153506 A1 | 8/2004 | Ito et al. |
| 2004/0166878 A1 | 8/2004 | Erskine et al. |
| 2004/0213393 A1 | 10/2004 | Bedingfield et al. |
| 2004/0233840 A1 | 11/2004 | Bye |
| 2004/0240638 A1 | 12/2004 | Donovan |
| 2005/0027867 A1 | 2/2005 | Mueller et al. |
| 2005/0070310 A1 | 3/2005 | Caspi et al. |
| 2005/0107091 A1 | 5/2005 | Vannithamby et al. |
| 2005/0202836 A1 | 9/2005 | Schaedler et al. |
| 2006/0291488 A1 | 12/2006 | Naqvi et al. |
| 2007/0185809 A1 | 8/2007 | Duan |
| 2007/0195788 A1 | 8/2007 | Vasamsetti et al. |
| 2008/0043689 A1 | 2/2008 | Walter |
| 2008/0142599 A1 | 6/2008 | Benillouche et al. |
| 2009/0109845 A1 | 4/2009 | Andreasen et al. |
| 2009/0207730 A1 * | 8/2009 | Stamoulis et al. ......... 370/230.1 |
| 2009/0225762 A1 | 9/2009 | Davidson et al. |

(56) References Cited

U.S. PATENT DOCUMENTS

| | | |
|---|---|---|
| 2009/0228956 A1 | 9/2009 | He et al. |
| 2009/0325574 A1 | 12/2009 | Izawa et al. |
| 2009/0327112 A1 | 12/2009 | Li et al. |
| 2010/0048161 A1 | 2/2010 | He et al. |
| 2010/0080171 A1 | 4/2010 | Rune et al. |
| 2010/0137002 A1 | 6/2010 | Agarwal et al. |
| 2010/0161802 A1 | 6/2010 | Tofighbakhsh et al. |
| 2010/0184403 A1 | 7/2010 | Cai et al. |
| 2010/0241496 A1 | 9/2010 | Gupta et al. |
| 2010/0246500 A1 | 9/2010 | Rydnell et al. |
| 2010/0287121 A1* | 11/2010 | Li et al. ............ 705/400 |
| 2010/0291924 A1 | 11/2010 | Antrim et al. |
| 2010/0297985 A1 | 11/2010 | Van Erlach |
| 2011/0003579 A1 | 1/2011 | Cai et al. |
| 2011/0103261 A1 | 5/2011 | Duan |
| 2011/0116382 A1 | 5/2011 | McCann et al. |
| 2011/0158090 A1* | 6/2011 | Riley et al. ............ 370/230 |
| 2011/0170412 A1 | 7/2011 | Ramadas et al. |
| 2011/0188457 A1 | 8/2011 | Shu et al. |
| 2011/0208853 A1 | 8/2011 | Castro-Castro et al. |
| 2011/0217979 A1* | 9/2011 | Nas ............ 455/433 |
| 2011/0231540 A1 | 9/2011 | Tai et al. |
| 2011/0246586 A1 | 10/2011 | Steele |
| 2011/0307790 A1* | 12/2011 | Pandya et al. ............ 715/735 |
| 2011/0317557 A1* | 12/2011 | Siddam et al. ............ 370/232 |
| 2012/0026947 A1 | 2/2012 | Miller et al. |
| 2012/0028626 A1 | 2/2012 | Marocchi et al. |
| 2012/0034900 A1 | 2/2012 | Agarwal |
| 2012/0039175 A1 | 2/2012 | Sridhar et al. |
| 2012/0052866 A1* | 3/2012 | Froehlich et al. ............ 455/445 |
| 2012/0084371 A1 | 4/2012 | Rajagopalan et al. |
| 2012/0094685 A1* | 4/2012 | Marsico ............ 455/456.1 |
| 2012/0096139 A1 | 4/2012 | Cackowski et al. |
| 2012/0099529 A1 | 4/2012 | Williams |
| 2012/0099715 A1 | 4/2012 | Ravishankar et al. |
| 2012/0100849 A1* | 4/2012 | Marsico ............ 455/432.1 |
| 2012/0129488 A1 | 5/2012 | Patterson et al. |
| 2012/0140632 A1* | 6/2012 | Norp et al. ............ 370/235 |
| 2012/0163297 A1 | 6/2012 | Agarwal et al. |
| 2012/0176894 A1* | 7/2012 | Cai et al. ............ 370/230 |
| 2012/0220330 A1 | 8/2012 | Goldner et al. |
| 2013/0017803 A1 | 1/2013 | Li et al. |
| 2013/0036215 A1 | 2/2013 | Kupinsky et al. |

FOREIGN PATENT DOCUMENTS

| | | |
|---|---|---|
| EP | 0 258 654 | 3/1988 |
| EP | 0 264 023 | 4/1988 |
| EP | 1 100 279 A2 | 5/2001 |
| EP | 1 988 680 A1 | 11/2008 |
| EP | 2 093 931 A1 | 8/2009 |
| GB | 2 382 267 | 5/2003 |
| JP | 58-215164 | 12/1983 |
| JP | 62-200859 | 9/1987 |
| KR | 1020030025024 A | 3/2003 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |
| WO | WO 00/16583 | 3/2000 |
| WO | Wo 00/35155 A1 | 6/2000 |
| WO | WO 01/20920 A1 | 3/2001 |
| WO | WO 01/56308 A2 | 8/2001 |
| WO | WO 2006/031678 A2 | 3/2006 |
| WO | WO 2009/058067 A1 | 5/2009 |
| WO | WO 2011/082035 A2 | 7/2011 |
| WO | WO 2012/021344 A2 | 2/2012 |
| WO | WO 2013/126057 A1 | 8/2013 |

OTHER PUBLICATIONS

Final Office Action for U.S. Appl. No. 13/402,756 (Sep. 19, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Notice of Allowance and Fee(s) Due for U.S. Appl. No. 13/277,626 (Aug. 20, 2013).
Commonly-assigned, co-pending International Applicaton No. PCT/US13/51447 for "Methods, Systems and Computer Readable Media for Distributing Policy Rules to the Mobile Edge," (Unpublished, filed Jul. 22, 2013).
Commonly-assigned, co-pending U.S. Appl. No. 13/947,314 for "Methods, Systems and Computer Readable Media for Distributing Policy Rules to the Mobile Edge," (Unpublished, filed Jul. 22, 2013).
Non-Final Office Action for U.S. Appl. No. 13/040,020 (Jul. 18, 2013).
Commonly-assigned, co-pending U.S. Appl. No. 13/942,323 for "Methods, Systems, and Computer Readable Media for Dynamically Controlling Congestion in a Radio Access Network," (Unpublished, filed Jul. 15, 2013).
Commonly-assigned, co-pending International Applicaton No. PCT/US13/50512 for "Methods, Systems, and Computer Readable Media for Dynamically Controlling Congestion in a Radio Access Network," (Unpublished, filed Jul. 15, 2013).
Final Office Action for U.S. Appl. No. 13/251,784 (Jun. 26, 2013).
Final Office Action for U.S. Appl. No. 12/973,228 (Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (Apr. 11, 2013).
Non-Final Office Action for U.S. Appl. No. 12/973,228 (Feb. 1, 2013).
Non-Final Office Action for U.S. Appl. No. 13/251,784 (Dec. 19, 2012).
Communication of European Publication Number and Information on the Application of Article 67(3) EPC for European Patent Application No. 10841576.1 (Oct. 10, 2012).
Commonly-assigned, co-pending U.S. Appl. No. 61/671,691 for "Methods and System for Dynamically Controlling Signaling Costs in a Mobile Network," (Unpublished, filed Jul. 14, 2012).
Notification of Transmittal of the International Search Report and the Written Opinion of the International Searching Authority, or the Declaration for International Patent Application No. PCT/US2010/061586 (Sep. 26, 2011).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System(EPS); Evolved General Packet Radio Service (GPRS) Tunnelling Protocol for Control Plane

(56) References Cited

OTHER PUBLICATIONS (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE + ePC = EPS), IMS, PCC and SDM," Effort, pp. 1-229 (Part 1 of 2) (May 2010).
Znaty, "Diameter, GPRS, (LTE + ePC = EPS), IMS, PCC and SDM," Efort pp. 230-461 (Part 2 of 2) (May 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Non-Final Office Action for U.S. Appl. No. 13/402,756 (May 10, 2013).
Non-Final Office Action for U.S. Appl. No. 13/274,936 (May 1, 2013).
Non-Final Office Action for U.S. Appl. No. 13/277,626 (Feb. 27, 2013).
Notification of Transmittal of the International Search Report and the Written Opinion of the International Searching Authority, or the Declaration for International Application No. PCT/US2012/026178 (Jul. 30, 2012).
Commonly-assigned, co-pending International Application No. PCT/US12/26178 for "Methods, Systems, and Computer Readable Media for Network Metadata Based Policy Control," (Unpublished, filed Feb. 22, 2012).
"About 3GPP: What is the difference between a SIM and a USIM? What is a UICC?," About http://www.3gpp.org/FAQ#outil_sommaire_58, pp. 1-11 (Copyright 2012).
"Smart Cards; Card Application Toolkit (CAT) (Release 10)," ETSI TS 102 223 V10.5.0, pp. 1-224 (Sep. 2011).
"3rd Generation Partnership Project; Technical Specification Group Services and System Aspects; Universal Geographical Area Description (GAD) (Release 10)," 3GPP TS 23.032, pp. 1-29 (Mar. 2011).
"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).
"3rd Generation Partnership Project; Technical Specification Group Core Network and Terminals; Policy and Charging Control over Rx reference point (Release 9)," 3GPP TS 29.214 V9.3.0, pp. 1-44 (Mar. 2010).
"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).
"BICC Architecture and BICC Protocol Details," Tekelec, p. 28-41 (2008).
"BICC Signaling Router (BSR) Reference Architecture (WP005274)," Tekelec, p. 2-91 (2008).
Jennings et al., "Session Initiation Protocol (SIP) URIs for Application such as Voicemail and Interactive Voice.Response (IVR)," The Internet Society, RFC 4458 (Apr. 2006).
"Interworking Between Session Initiation Protocol (SIP) and Bearer Independent Call Control Protocol or ISDN User Part," ITU-T Q.1912.5, p. 1-101 (Mar. 2004).
"Prepaid vs. Number Portability," Power Point presentation (publication date unknown; electronic file creation date Jul. 29, 2003.).
"Bearer Independent Call Bearer Control Protocol," ITU-T Q.1950, p. 1-96 (Dec. 2002).
Chang, "BICC Extension of SIP in Inter-Network Configuration," Internet Engineering Task Force, draft-chang-sipping-bicc-network-00.txt, pp. 1-17 (Mar. 2002).
Marshall et al., "SIP Extensions for Supporting Distributed Call State," SIP Working Group, Internet Draft, pp. 1-12 (Aug. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, p. 1-23 (Jul. 2001).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, pp. 1-17 (Mar. 10, 2000).
Liao et al., "SS7-TCAP/IP Interworking," Internet Engineering Task Force, pp. 1-14 (Mar. 1999).
De Ment, "The Evolution of Signaling," NMS Communications, p. 1-28 (Publication Date Unknown).
"Mobile Wireless Overview," Cisco IOS Mobile Wireless Configuration Guide, pp. MWC-1-MWC-8 (Publication Date Unknown).

* cited by examiner

POLICY AND CHARGING RULES FUNCTION (PCRF) AND PERFORMANCE INTELLIGENCE CENTER (PIC) BASED CONGESTION CONTROL

PRIORITY CLAIM

This application claims the benefit of U.S. Provisional Patent Application Ser. No. 61/424,603 filed Dec. 17, 2010; the disclosure of which is incorporated herein by reference in its entirety.

TECHNICAL FIELD

The subject matter described herein relates to congestion control in mobile communications networks. More particularly, the subject matter described herein relates to PCRF and PIC based congestion control.

BACKGROUND

Service providers are facing radio access network (RAN) congestion challenges as a result of the explosive growth in mobile data traffic. Current growth is being driven by increasing 3G and 4G penetration, widespread adoption of new smart phone devices, and increasing use of bandwidth intensive applications. Such growth has resulted in service degradation for mobile subscribers attached to congested cell sites and has created challenges in implementing fair usage policies to manage network congestion in the core network and in the RAN.

The congestion in a cell is primarily caused by one or more of the following types of traffic:
1. Circuit-Switched Traffic: Because circuit-switched calls are given higher priority compared to data sessions, excessive amounts of circuit-switched calls made by subscribers from a cell may contribute to cell congestion. Circuit-switched calls are allocated bandwidth resources during call setup, which is part of the total amount of resources available to the cell.
2. Signaling Traffic: Excessive amounts of signaling messages exchanged between the mobile phones and the radio tower may contribute to cell congestion. Excessive signaling messages are exchanged because of a number of factors including mobile phones trying to conserve battery power, interference from other cells, etc.
3. User Data Traffic: Excessive amounts of data usage by subscribers from smart phones and from 3G and 4G wireless cards (dongles) on their computers may contribute to cell congestion. Each data session is allocated a fixed amount of bandwidth during the session setup, which is a part of the total amount of bandwidth available to the cell.

Each of these types of traffic individually and together contribute to cell congestion. It is desirable to find a way to fairly and efficiently control bandwidth usage in a cell. Accordingly, there exists a need for methods, systems, and computer readable media for PCRF and PIC based congestion control.

SUMMARY

The subject matter described herein includes methods, systems, and computer readable media for PCRF and PIC based congestion control. According to one aspect, the subject matter described herein includes a system for congestion control in a mobile communications network. The system includes a monitoring module configured to monitor message traffic associated with a cell in a mobile communications network. The message traffic includes control plane and user plane messages. The monitoring module determines based on the message traffic, whether a predetermined congestion threshold associated with the cell in the mobile communications network has been crossed. In response to determining that the congestion threshold associated with the cell has been crossed, the monitoring module generates a cell congestion notification message that includes the identity of one or more subscribers that are contributing to the congestion. The system includes a policy server configured to receive the cell congestion notification message and to generate a policy and charging control (PCC) rule that modifies the policy of the one or more identified subscribers and for communicating the PCC rule to a policy and charging enforcement function (PCEF).

As used herein, the term "cell" refers to a definable part of the access portion of a mobile communications network. For example, a cell may be an area served by a radio tower in a 3G, 4G, or subsequent generation mobile communications network. A cell may also be an area served by a wireless access point where Wi-Fi is used to access a mobile communications network.

The subject matter described herein can be implemented using a non-transitory computer readable medium having stored thereon executable instructions that when executed by the processor of a computer control the computer to perform steps. Exemplary computer readable media suitable for implementing the subject matter described herein include chip memory devices, disk memory devices, programmable logic devices, and application specific integrated circuits. In addition, a computer readable medium that implements the subject matter described herein may be located on a single device or computing platform or maybe distributed across plural devices or computing platforms.

BRIEF DESCRIPTION OF THE DRAWINGS

The subject matter described herein will now be explained with reference to the accompanying drawings of which.

DETAILED DESCRIPTION

Figure 1:
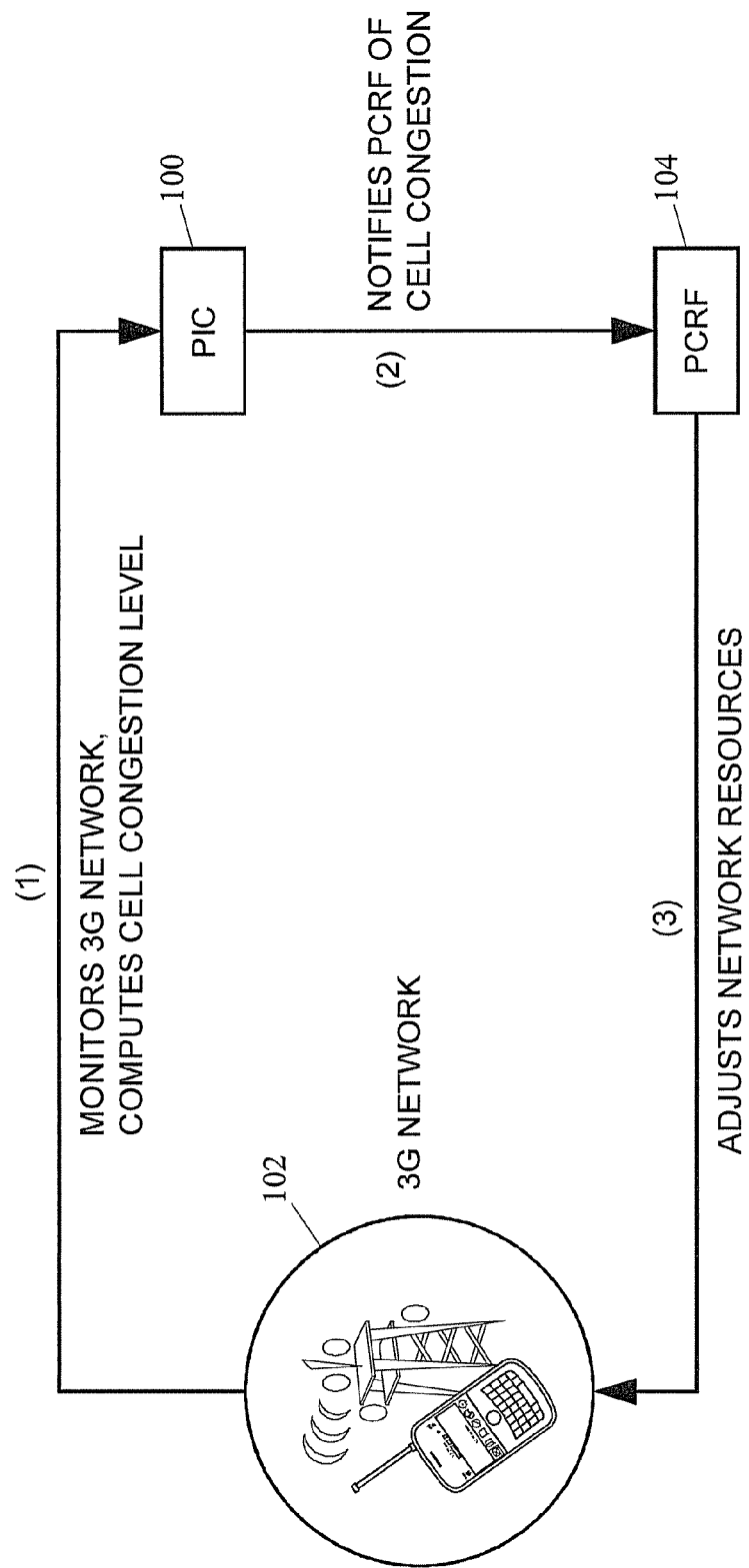
FIG. 1 is a network diagram illustrating exemplary network components for PIC and PCRF based congestion control according to an embodiment of the subject matter described herein.

According to one aspect, the subject matter described herein includes a RAN congestion mitigation solution. The RAN congestion mitigation solution detects congestion in radio cells in near real-time by monitoring, measuring and interpreting signaling and data messages exchanged between network elements in a 3G, 4G, or NG network, where N is an integer greater than 4. On cells that are congested, the solution attempts to mitigate the effects of the congestion on the packet switched data traffic by applying bandwidth management policies. Examples of such policies include:
1. Lowering the overall bandwidth utilization in the affected cell by lowering the bandwidth utilization of subscribers who are over-using network resources. The solution identifies subscribers who are consuming unusually high proportions of the bandwidth and lowers their quality of service. This enables the rest of the subscribers to get access to the additional amount of bandwidth that got freed up, thereby, improving their quality of experience.
2. Redistributing the bandwidth proportionally based on managed subscriber tiers. This ensures that subscribers in the higher tiers are allocated more bandwidth compared to subscribers in the lower tiers.

The solution also analyzes the collected data to produce reports that help the service provider plan and tune their radio network resources.

One exemplary implementation of the subject matter described herein integrates two network elements:
1. Performance Intelligence Center (PIC), generically referred to herein as the monitoring module.
2. Policy and Charging Rules Function (PCRF), generically referred to herein as the policy server.

The function of the PIC or monitoring module is to detect cell congestion and the severity of the congestion using control and/or user plane link probes that monitor, from the wireline side, communications to and from network elements that connect to a radio access network (e.g., GRAN, GERAN, UTRAN, Long Term Evolution, E-UTRAN, Wi-Fi access network, WiMax access network, etc.) and to notify the PCRF when congestion/decongestion conditions occur. The PIC or monitoring module may alternatively monitor messages on the wireless side of the RNC, i.e., between the RNC and the eNode B, without departing from the scope of the subject matter described herein.

The function of the PCRF or policy server is to act on the cell congestion data provided by PIC and apply appropriate policies to mitigate the congestion. According to one aspect of the subject matter described herein, a PIC monitoring module and a PCRF work together to detect and mitigate cell congestion in a wireless or radio access network and exemplary architectures and operational scenarios are described in detail below.

A new set of policies relating to RAN congestion is added in the PCRF. The policies can be provisioned by the service provider to define rules that are to be applied when congestion occurs. Exemplary rules include adjusting the quality of service (QoS) for subscribers in the congested cells and/or denying new context activations from mobile subscribers. A new messaging infrastructure is implemented for the PIC—PCRF communication.

Theory of Operation
High Level Functional Description

As mentioned in the previous section, one exemplary implementation of the subject matter described herein includes a PIC and a PCRF, as shown in FIG. 1. In FIG. 1, PIC or monitoring module 100 monitors traffic associated with mobile subscribers in mobile communications network 102, computes a level of congestion in mobile communications network 102 and notifies PCRF or policy server 104 when a specified congestion level is exceeded. The computed level of congestion may be a level of congestion in the radio access network, the core network, or both. Included in the congestion information provided to the PCRF is information that identifies one or more mobile subscribers that may be associated with the identified RAN congestion event. PCRF or policy server 104 may communicate with a policy and charging enforcement function (PCEF) (not shown in FIG. 1) to adjust the policies of the identified mobile subscribers to mitigate the congestion.

Figure 2:
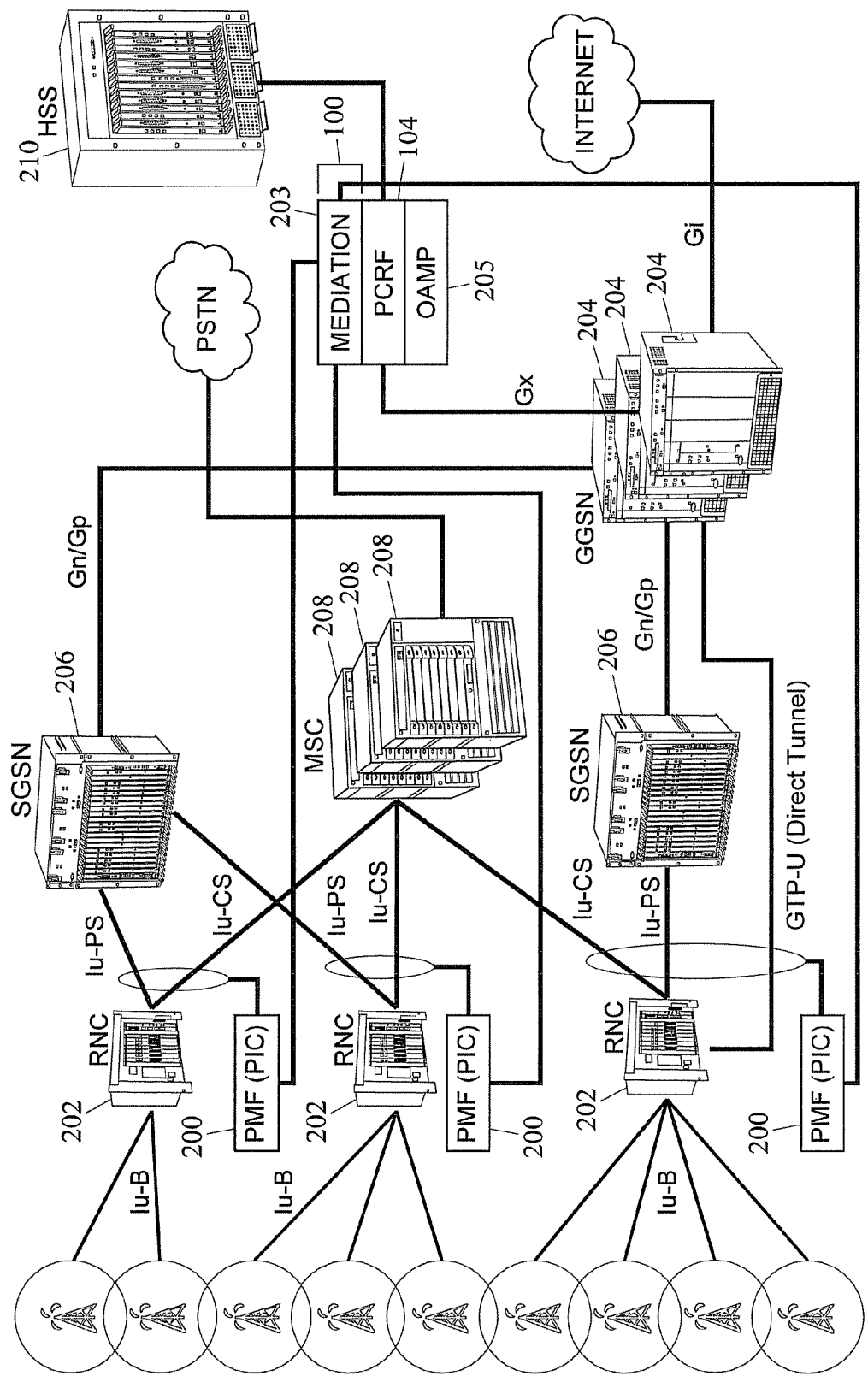
FIG. 2 is a network diagram illustrating an exemplary deployment of the components for PIC and PCRF based congestion control from FIG. 1 in a mobile communication according to an embodiment of the subject matter described herein.

FIG. 2 illustrates an exemplary architecture of a mobile communications network including a system for PIC and PCRF based congestion control according to an embodiment of the subject matter described herein in more detail. In FIG. 2, PIC 100 is co-located with PCRF 104, PIC 100 includes link probes 200 that tap various interfaces and copy signaling messages, data traffic, and circuit switched traffic from those interfaces for network performance analysis purposes. The original signaling messages, data traffic, and circuit switched traffic continue to their original destinations. The copied signaling messages, data traffic, and circuit switched traffic are provided to one or more downstream applications for further processing, such as RAN congestion determination processing.

In the illustrated example, probes 200 are co-located with RNCs 202. In an alternate example, probes 200 may be integrated within RNCs 202. The function of PIC 100 is to monitor the Iu packet switched (Iu-PS), Iu circuit switched (Iu-CS) interfaces and general packet radio service tunneling protocol (GTP) direct tunnels between RNC 202 and gateway GPRS support nodes (GGSNs) 204, servicing GPRS support nodes (SGSNs) 206, and mobile switching centers (MSCs) 208, measure network performance and detect congestion of cells. Probes 200 tap the above-mentioned interfaces and acquire all the PDUs being exchanged between RNCs 202 and SGSNs 206 and between RNCs 202 and GGSNs 204 (direct tunnel). PIC 100 uses the collected protocol data untis (PDUs) to compute bandwidth usage per cell site as well as other indications of congestion. PIC 100 notifies PCRF 104 when there is a change in the congestion level.

Figure 3:
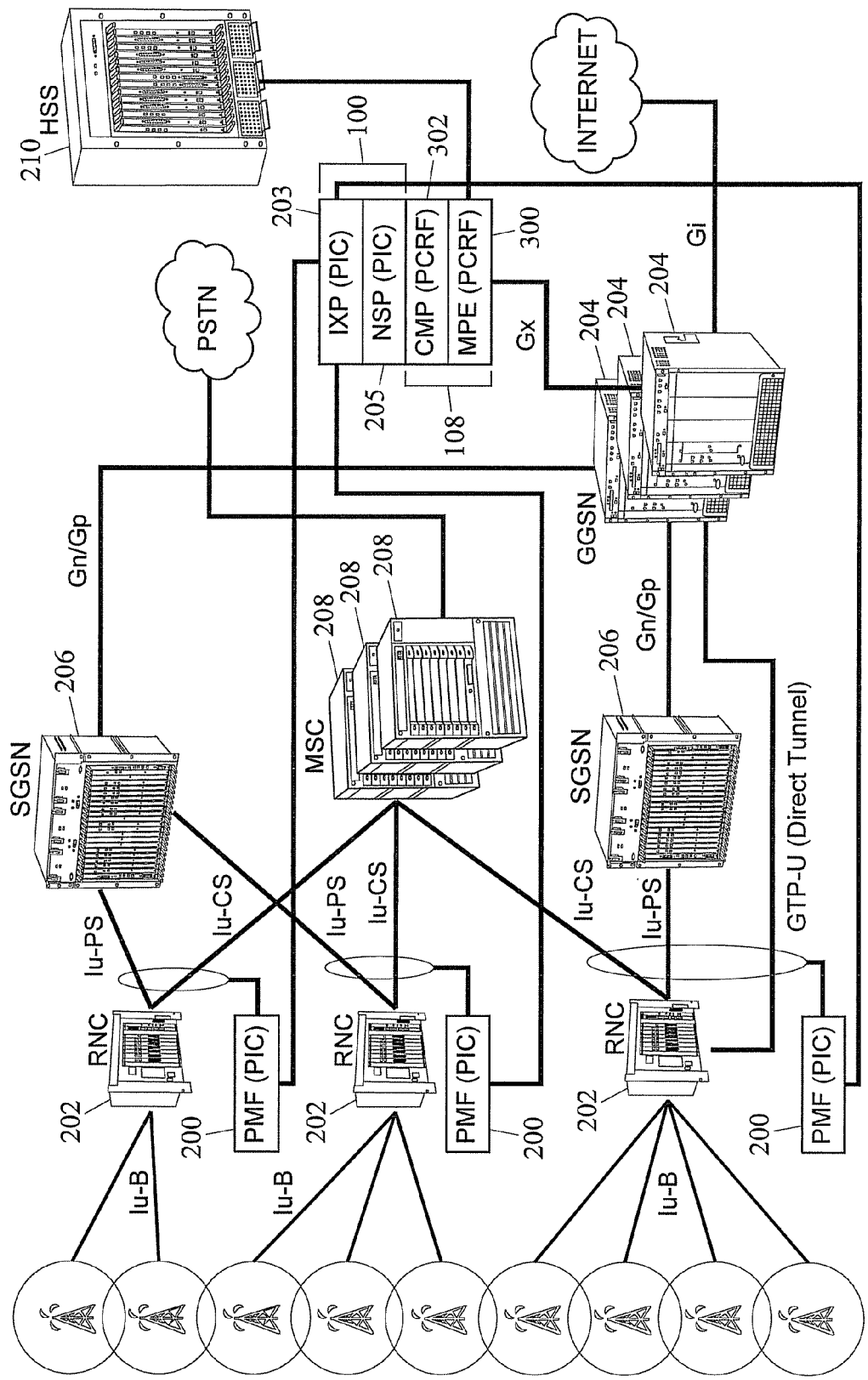
FIG. 3 is a network diagram illustrating additional details of the network components for PIC and PCRF based congestion from FIG. 1 control according to an embodiment of the subject matter described herein.

FIG. 3 illustrates exemplary architecture for PIC 100 in more detail. In the illustrated example, PIC 100 includes the following sub-systems:
1. Probe message feeder (PMF) servers 200 with IP probes for non-intrusively monitoring the Iu-PS, Iu-CS and direct tunnel interfaces. In FIG. 2, PMF servers 200 are illustrated using the "Probe" component 200.
2. Integrated call or session detail record (XDR) processing (IXP) servers 203 for processing the information and detecting RAN congestion. IXP servers 203 may generate call and/or session details records and use information derived from these records to make congestion determinations. In FIG. 2, IXP servers 203 are illustrated as "Mediation" component 203.
3. A network services platform (NSP) server 205 for system configuration and presenting the RAN congestion analytics. In FIG. 2, NSP server 205 is illustrated as the "OAMP" component 205.

As shown in FIGS. 2 and 3, IXP 203 and NSP servers 205 are co-located with PCRF 104. The PIC system acts as an adjunct component to PCRF 104 that provides a window to activities occurring in the radio network.

PCRF 104 system receives congestion/decongestion notification messages from the PIC monitoring module (IXP) and applies appropriate subscriber policy control actions. The subscriber policies may be communicated to GGSNs 204 using Diameter messages on the Gx interface. GGSNs 204 enforce the policy rules provisioned by PCRF 104. PCRF 104 may also access/utilize subscriber profile information (e.g., subscriber service level [e.g., Platinum, Gold, Silver], etc.) in the process of making policy decisions. Subscriber profile data may be stored, for example, in a subscriber profile repository (SPR), subscriber data management (SDM) module, a home location register (HLR), or a home subscriber server (HSS). In this example, PCRF 104 supports standard 3GPP-specified interfaces for retrieving subscriber information from HSS 210. In one embodiment, where PCRF 104 is configured to use HSS 210, HSS 210 can be provisioned as the subscriber data source. If HSS 210 is integrated with PCRF 104, PCRF 104 automatically merges information from HSS 210 when a Gx session for a particular IMSI or hardware ID is bound to the PCRF. In one embodiment, PCRF 104 automatically queries HSS 210 at the time of Gx attachment in order to retrieve information regarding the subscriber.

In the example illustrated in FIG. 3, PCRF 104 includes the following sub-systems:

1. Multimedia policy engine (MPE) servers 300 implement the policy charging and enforcement functions as specified by the 3GPP specifications.
2. A CMP server 302 for policy configuration and monitoring.

PIC Functional Description
RAN Congestion Detection

PIC 100 may monitor message traffic on a wired interface of a radio network control device. For example, PIC 100 may monitor the Iu interface of an RNC. However, all the data needed to compute data usage and detect congestion may not be available from the Iu interface. PIC 100 may not monitor the Iu-b interface (interface between the node B and the RNC) and therefore may not have a view into the radio resource control messages being exchanged between the node Bs and the RNC. Monitoring Iu-b messages in order to determine congestion requires too many probes and is not considered to be a viable approach by most service providers. The lack of Iu-b monitoring is compensated for by employing an approximation-based detection algorithm for identifying RAN congestion. In an exemplary LTE embodiment, a PIC monitoring module may monitor traffic associated with mobile subscribers on communication links associated with an S1-C and/or and S1-U interface between an eNode B and a Mobility Management Entity (MME). In another exemplary embodiment, in order to obtain mobile subscriber identifying information, a PIC monitoring module may monitor control plane traffic (e.g., Update Location Request/Answer, Cancel Location Request/Answer, etc.) associated with mobile subscribers on communication links associated with an S6 interface between an MME and an HSS. In another exemplary embodiment, in order to obtain mobile subscriber identifying information, a PIC monitoring module may monitor control plane traffic (e.g., MAP Update Location, MAP Insert Subscriber Data, MAP Cancel Location, etc.) associated with mobile subscribers on communication links associated with an MAP interface between an mobile switching center (MSC) and a home location register (HLR), and/or between a SGSN and HLR.

In one implementation, a RAN congestion application residing in IXP 203 utilizes the following metrics per cell to assist in the identification of RAN congestion. This approach is the simplest to implement, and the solution scales up very well.

1. Circuit switched call volume.
2. Packet switched data volume.
3. Radio bearer establishment/reestablishment allocated/granted rankings.
4. Rate of radio bearer releases caused by congestion.
5. Total amount of bandwidth allocated for circuit switched calls.
6. Total amount of bandwidth allocated for packet switched sessions.
7. Total amount of bandwidth de-allocated by the RNC because of circuit switched call terminations.
8. Total amount of bandwidth de-allocated by the RNC because of packet switched session terminations.

Optional additional metrics are also employed to enhance the accuracy of detection of RAN congestion, including but not limited to:

1) Key performance indicator (KPI) feeds from the RAN equipment (measurements to be determined): This KPI may be able provide very good indications of cell congestion. Given that different RAN vendors have different KPI output and have different methods for extraction of the KPI, integration work is required at site to extract, transform and load the data into PIC in near real time.
2) TCP Retransmission rate (number/s) and average TCP round-trip time (RTT): These parameters can be used to detect issues with the radio network.
3) Historical data collected over a period of time.

The RAN congestion application computes the above-mentioned measurements every 30 seconds (configurable) based on the data collected from the probes and computes a normalized congestion value (NCV) for a cell by comparing each of the measurements with preconfigured thresholds and applying a configurable weight factor for each of the measurements. The computation produces a NOV between 0 and 100. The configurable nature of the thresholds and weights allow the network operator to fine-tune the algorithm based on the characteristics of the network. The NOV may be a normalized value of a chosen congestion metric measured at the cell site, normalized over all cell sites. An example is percentage of bandwidth used up for user data in a cell site (this value is already normalized, being expressed as a 0-100 number). The reference load or threshold may be procured from operator configuration or based on hysteresis.

Congestion Level

When a congestion condition is detected, the information is communicated to the PCRF by providing the location, congestion level and other useful information. In one exemplary implementation, PIC 100 supports the following three congestion levels:

1) NORMAL: The site is not congested.
2) WARNING: The site is moderately congested.
3) SEVERE: The site has reached/exceeded its capacity.

A normalized congestion value (NCV) computed by PIC 100 is compared with preconfigured threshold levels to determine the congestion level. PIC 100 sends a notification to PCRF 104 when the congestion level is different from the congestion level computed during the previous interval.

To avoid jittery notifications, a hysteresis value is applied to the NCV. The value is configurable and has a default value of 2%. This value is used to temper the notification mechanism so that PCRF 104 does not receive notification messages when a threshold is crossed by a small factor.

PCRF Functional Description

PCRF actions and algorithms will now be described. Initially, a new IP-CAN setup initializes a Gx session at the PCRF between PCRF and the PCEF. In one embodiment, the PCRF will, using any number of configured data sources, and procure the information for the attached session (using IMSI as a key, for example). In another embodiment, the PCRF receives a message from the PIC over an interface between the PIC and the PCRF listing the following information:

(1) Cell global identifier (CGI)
(2) Load indicator: WARNING or SEVERE
(3) List of IMSIs in cell site A number of configurables on the PCRF may be needed for triggering action by the PCRF. Exemplary configurables are detailed below:
  (1) Cell-site congestion status-based rules are to be configured, and an appropriate action(s) is/are to be configured. For example, one could configure a rule that is described as follows: "When the cell-site congestion status=WARNING, reduce the QoS to 100 kbps," or "When the cell-site congestion status=SEVERE and user tier=BRONZE, reduce QoS to 10 kbps" etc.
  (2) Un-re-QoSing intervals need to be configured. These intervals determine how long the re-QoSed flow will remain before the QoS will be restored back to original levels.

Interface Descriptions

This section describes exemplary messaging interface between PIC 100 and PCRF 104. As mentioned in the previous section, PIC 100 sends a notification message to PCRF 104 when a congestion level is exceeded. In one embodiment, this is the only message that is exchanged between the two network elements, although other embodiments may involve additional messages. The following section describes a congestion notification message as well as the other messages that may be exchanged between PIC 100 and PCRF 104 according to an embodiment of the subject matter described herein.

Congestion notification messages may be exchanged using a SOAP/HTTP/TCP/IP transport over an agreed upon port. The SOAP service may be served by the PCRF, and the PIC acts as the SOAP client. The message may be encrypted and there may be a BASIC authentication mechanism at the server end (PCRF) to authenticate the sender (PIC).

The request message may be encoded as per SOAP rules. As with any SOAP message, the message consists of a request-response pair with a response timeout set to 30 seconds at the client level.

Congestion Notification Message

This message may be sent by PIC 100 to notify PCRF 104 of changes to the congestion level. As mentioned earlier, the message may be sent to PCRF 104 if there is a change in the congestion level. The request message may include, but is not limited to, the following elements:
  Location: Location of the cell including:
    MCC (mobile country code)
    MNC (mobile network code)
    LAC (location area code)
    CI/SAC/RAC (cell identity).
  Congestion level: NORMAL, WARNING, SEVERE.
  Subscriber List in the congested/decongested cell containing the following information:
    IMSI
    % Bandwidth usage
    Handset type
    Application
  Direction indicator: UP or DOWN to indicate if the new level was an upward or a downward change.

The response message is an acknowledgement with no parameters.

Figure 4:
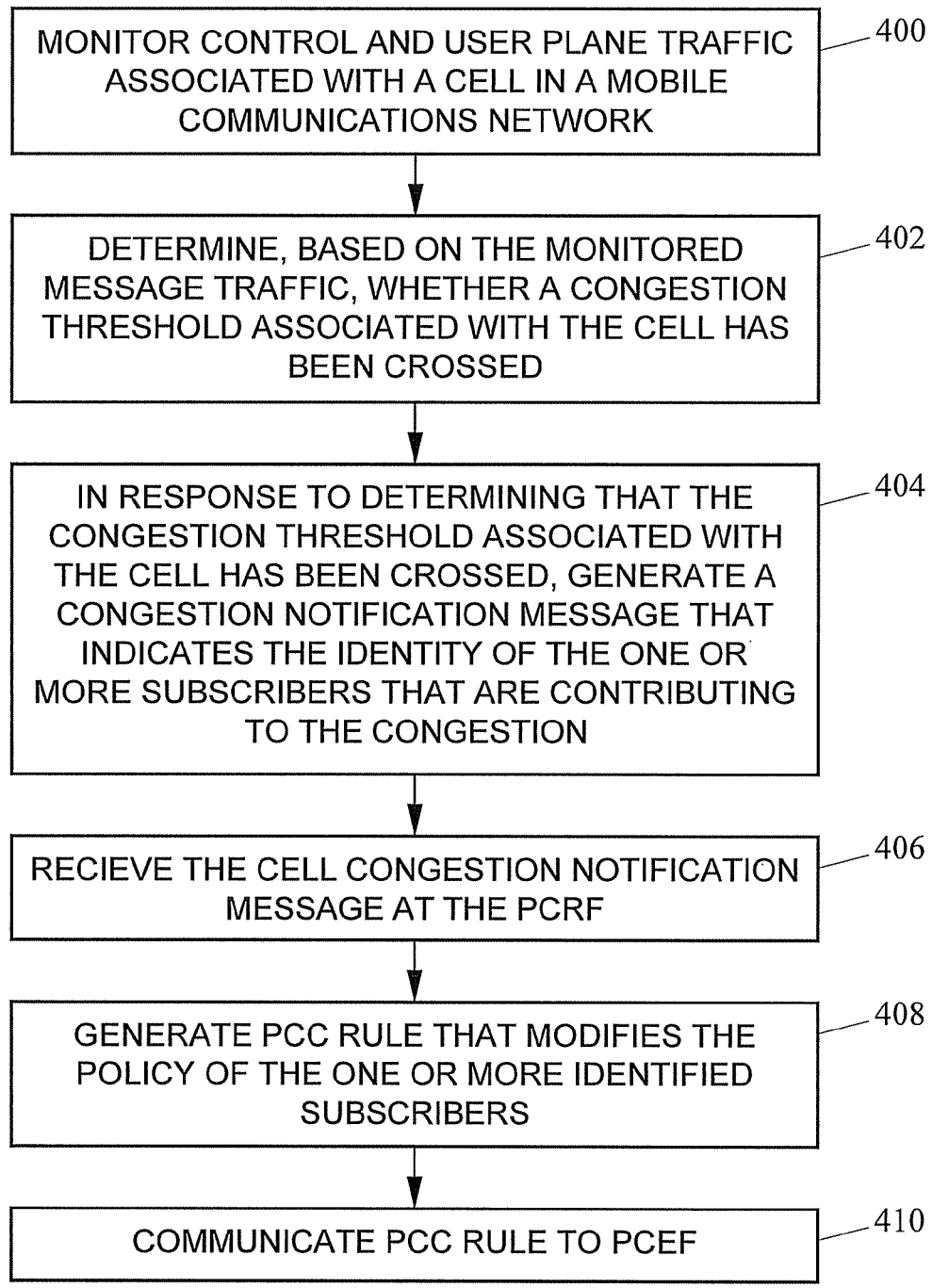
FIG. 4 is a flow chart illustrating an exemplary process for PIC and PCRF based congestion control according to an embodiment of the subject matter described herein.

FIG. 4 is a flow chart illustrating exemplary overall steps for PIC and PCRF based congestion control according to an embodiment of the subject matter described herein. Referring to FIG. 4, in step 400, a monitoring module monitors message traffic associated with a cell in a mobile communications networks. The message traffic includes control plane and user plane messages. For example, PIC 100 may monitor signaling messages, data traffic, and call related traffic associated with a cell using probes 200 illustrated in FIG. 2. In step 402, the monitoring module determines, based on the message traffic, whether a predetermined congestion threshold associated with a cell has been crossed. For example, PIC 100 may compare measured traffic levels for the cell with a reference traffic level for the cell to determine whether congestion exists. In step 404, in response to determining that the predetermined threshold associated with a cell has been crossed, the monitoring module generates a cell congestion notification message that includes the identity of one or more subscribers that are contributing to the congestion. For example, PIC 100 may generate the above described congestion notification message including parameters that identify the subscriber(s) contributing the congestion and parameters that identify the cell.

In step 406, a policy server receives the congestion notification message. For example, PCRF 104 may receive the congestion notification message from PIC 100. In step 408, the policy server generates a policy and charging control (PCC) rule that modifies the policy of the one or more identified subscribers. For example, PCRF 104 may generate a PCC rule to reduce the QoS for the subscribers identified in the congestion notification message. In step 408, the policy server communicates the PCC rule to a policy and charging enforcement function. For example, PCRF 104 may communicate the PCC rule to a PDN gateway, a DPI, a gateway GPRS support node, or other node capable of enforcing the policy for the identified subscribers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for congestion control in a mobile communications network, the system comprising:
  a monitoring module configured to:
    monitor message traffic associated with a cell in a communications network, wherein the message traffic includes control plane and user plane messages;
    determine, based on the message traffic, whether a predetermined congestion threshold associated with the cell has been crossed; and
    in response to determining that the congestion threshold associated with the cell has been crossed, generate a cell congestion notification message that includes an identity of one or more subscribers that are contributing to a congestion; and
  a policy server configured to:
    receive the cell congestion notification message;
    generate a policy and charging control (PCC) rule that modifies a policy of the one or more identified subscribers; and
    communicate the PCC rule to a policy and charging enforcement function (PCEF),
    wherein the monitoring module is configured to determine whether the congestion threshold has been crossed by computing a congestion indicator based on circuit switched call volume, packet switched data volume, radio bearer establishments, rate of radio bearer releases caused by congestion, total amount of bandwidth allocated for circuit switched calls, total amount of bandwidth allocated for packet switched sessions, total amount of bandwidth de-allocated because of circuit switched call terminations, and total amount of bandwidth de-allocated because of packet switched session terminations.

2. The system of claim 1 wherein the monitoring module is configured to monitor message traffic on an interface of at least one radio network control device.

3. The system of claim 2 wherein the interface comprises an Iu interface and wherein the at least one radio network control device comprises at least one radio network controller (RNC).

4. The system of claim 1 wherein the cell congestion notification message includes at least one international mobile station identifier (IMSI) for the one or more identified subscribers.

5. The system of claim 1 wherein the monitoring module is configured to determine whether the predetermined congestion threshold has been crossed by computing a congestion indicator value based on key performance indicator (KPI) feeds from radio access network equipment, transmission control protocol (TCP) retransmission rates, average TCP round trip times, and historical data collected over a period of time.

6. The system of claim 1 wherein the cell congestion notification message includes one of: network resource usage information, mobile device type, user application identifying information, and geo-location information associated with a subscriber.

7. The system of claim 1 wherein the cell congestion notification message includes at least one of: a cell identifier and cell location information.

8. The system of claim 1 wherein the cell congestion notification message includes a cell congestion level indicator value.

9. The system of claim 1 wherein the policy server comprises a policy and charging rules function (PCRF).

10. The system of claim 1 wherein the PCEF comprises one of: a gateway general packet radio service support node (GGSN), a packet data network (PDN) gateway, and a deep packet inspection (DPI) element.

11. A method for congestion control in a mobile communications network, the method comprising:

monitoring control and user plane traffic associated with a cell in a mobile communications network;

determining, based on the monitored message traffic, whether a congestion threshold associated with the cell has been crossed;

in response to determining that the congestion threshold associated with the cell has been crossed, generating a congestion notification message that includes an identity of one or more subscribers that are contributing to a congestion;

receiving the congestion notification message at a policy server;

generating a policy control and charging rule that modifies a policy of the one or more subscribers; and communicating the PCC rule to a policy and charging enforcement function (PCEF), wherein determining whether the congestion threshold has been crossed includes computing a congestion indicator based on circuit switched call volume, packet switched data volume, radio bearer establishments, rate of radio bearer releases caused by congestion, total amount of bandwidth allocated for circuit switched calls, total amount of bandwidth allocated for packet switched sessions, total amount of bandwidth de-allocated because of circuit switched call terminations, and total amount of bandwidth de-allocated because of packet switched session terminations.

12. The method of claim 11 wherein monitoring the control and user plane traffic includes monitoring the control and user plane traffic on an interface of at least one radio network control device.

13. The method of claim 11 wherein the interface comprises an Iu interface and wherein the at least one radio network control device comprises at least one radio network controller (RNC).

14. The method of claim 11 wherein determining whether the predetermined congestion threshold has been crossed includes computing a congestion indicator value based on key performance indicator (KPI) feeds from radio access network equipment, transmission control protocol (TCP) retransmission rates, average TCP round trip times, and historical data collected over a period of time.

15. The method of claim 11 wherein generating the cell congestion notification message includes including international mobile subscriber identifiers (IMSIs) in the cell congestion notification message.

16. The method of claim 11 wherein generating the cell congestion notification message includes identifying network resource usage information, mobile device handset type, user application identifying information, and geo location information associated with a subscriber in the cell congestion notification message.

17. The method of claim 11 wherein generating the cell congestion notification message includes including at least one of a cell identifier and cell location information in cell congestion notification message.

18. The method of claim 11 wherein generating the cell congestion notification message includes including a cell congestion level indicator value in the cell congestion notification message.

19. The method of claim 11 wherein the policy server comprises a policy and charging rules function (PCRF).

20. The method of claim 11 wherein the PCEF comprises one of a gateway general packet radio service support node (GGSN), a packet data network (PDN) gateway, and a deep packet inspection (DPI) element.

21. A non-transitory computer readable medium having stored thereon executable instructions that when executed by a processor of a computer control the computer to perform steps comprising:

monitoring control and user plane traffic associated with a cell in a mobile communications network;

determining, based on the monitored message traffic, whether a congestion threshold associated with the cell has been crossed;

in response to determining that the congestion threshold associated with the cell has been crossed, generating a congestion notification message that includes an identity of one or more subscribers that are contributing to a congestion;

receiving the congestion notification message at a policy server;

generating a policy control and charging rule that modifies a policy of the one or more subscribers; and communicating the PCC rule to a policy and charging enforcement function (PCEF), wherein determining whether the congestion threshold has been crossed includes computing a congestion indicator based on circuit switched call volume, packet switched data volume, radio bearer establishments, rate of radio bearer releases caused by congestion, total amount of bandwidth allocated for circuit switched calls, total amount of bandwidth allocated for packet switched sessions, total amount of bandwidth de-allocated because of circuit switched call terminations, and total amount of bandwidth de-allocated because of packet switched session terminations.

* * * * *